United States Patent
Kim et al.

(10) Patent No.: US 7,397,745 B2
(45) Date of Patent: Jul. 8, 2008

(54) METHOD AND APPARATUS FOR IDENTIFYING DISC TYPE

(75) Inventors: Sang-whook Kim, Gangwon-do (KR); Young-woo Lee, Gyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 457 days.

(21) Appl. No.: 10/615,984

(22) Filed: Jul. 10, 2003

(65) Prior Publication Data
US 2004/0090894 A1 May 13, 2004

(30) Foreign Application Priority Data
Nov. 12, 2002 (KR) .................... 10-2002-0070059

(51) Int. Cl.
*G11B 7/00* (2006.01)
(52) U.S. Cl. .................................... 369/53.22
(58) Field of Classification Search ........................ None
See application file for complete search history.

(56) References Cited

U.S. PATENT DOCUMENTS

| | | | |
|---|---|---|---|
| 5,295,125 A * | 3/1994 | Oonishi et al. | 369/44.29 |
| 6,201,773 B1 * | 3/2001 | Aoki | 369/44.13 |
| 6,822,936 B2 * | 11/2004 | Ono et al. | 369/53.23 |
| 6,868,051 B2 * | 3/2005 | Ogihara | 369/53.2 |
| 2005/0270924 A1 * | 12/2005 | Yanagawa et al. | 369/44.32 |

* cited by examiner

*Primary Examiner*—Joseph Feild
*Assistant Examiner*—Joseph Haley
(74) *Attorney, Agent, or Firm*—Staas & Halsey LLP

(57) ABSTRACT

A method and apparatus identifying a type of a recordable disc using the reflectivity and RPM (Rotation Per Minute) of the disc. The method includes the operations of detecting an RPM (Rotation Per Minute) of the disc, identifying a first disc type by comparing the RPM with a first reference value, measuring the reflectivity of the disc, and identifying a second disc type between a one-time recordable disc type and a re-recordable disc type by comparing the reflectivity of the disc with a second reference value. Accordingly, the lead-in time of the disc can be reduced.

8 Claims, 4 Drawing Sheets

METHOD AND APPARATUS FOR IDENTIFYING DISC TYPE

CROSS-REFERENCE TO RELATED APPLICATIONS

This application claims the priority of Korean Patent Application No. 2002-70059, filed on Nov. 12, 2002, in the Korean Intellectual Property Office, the disclosure of which is incorporated herein in its entirety by reference.

BACKGROUND OF THE INVENTION

1. Field of the Invention

The present invention relates to a method and apparatus to identify a type of a disc in a disc drive, and more particularly, to a method and apparatus to identify a type of a recordable disc.

2. Description of the Related Art

There are various types of recordable discs, such as a recordable CD (compact disc) and a recordable DVD (digital versatile disc). The recordable DVDs can be divided into DVD−R/+R type discs, i.e., one-time recordable discs on which data can be recorded only one-time, and DVD−RW/DVD+RW type discs, i.e., re-recordable discs on which data can be recorded several times.

Although the shapes of the above-mentioned discs are the same regardless of the types of the discs, their physical disc formats are different according to the types of the discs. That is, a wobble is formed on one side or both sides of the discs, having a frequency of 140 KHz in the case of DVD−R/RW and a frequency of 817 KHz in the case of DVD+R/RW. Further, while the wobble of a DVD−R/RW is formed such that LPPs (Land Pre Pits) are formed in a land area, the wobble of a DVD+R/RW disc is formed using a phase modulation method.

In order to drive various types of discs having different physical formats in the same disc drive, the disc drive must be able to set operational conditions adequate to the physical format of a disc during a lead-in time period for the disc. The setting of the operational conditions is for normally reading data from or writing data to the disc. Setting a servo gain to stabilize servo operations is an example of setting the operational conditions of the disc drive. In order to set the operational conditions, the type of the disc must be correctly identified.

In a conventional method of identifying a type of a disc, the disc type is identified on the basis of an ID (identification) code recorded in a lead-in area of the disc. That is, after the operational conditions of a disc drive are set to read the ID code, the disc type is identified using the ID code recorded in the lead-in area and if the currently set operational conditions are adequate to the identified disc type, the lead-in operation for the disc is complete.

However, if the operational conditions of the disc drive are not adequate to the disc type, the disc drive must retry the setting of the operational conditions adequately to the disc type in order to identify that disc type. Accordingly, where the operational conditions of the disc drive are not adequate to the disc type to be identified, the lead-in operation is inefficiently performed.

SUMMARY OF THE INVENTION

The present invention provides a method and apparatus identifying a type of a recordable disc based on the reflectivity and RPM (Rotation Per Minute) of the disc.

Further, the present invention provides a method and apparatus identifying between a DVD(−) type disc and a DVD(+) type disc based on the RPM of the disc.

According to an aspect of the present invention, a method of identifying a type of a disc includes the operations of detecting an RPM (Rotation Per Minute) of the disc, and identifying a first disc type by comparing the RPM with a first reference value.

In the identification operation of the first disc type, whether the disc is a DVD(−) type or a DVD(+) type is determined. Further, in the identification operation of the first disc type, if the RPM is lower than the first reference value, the disc is identified as a DVD(−) type and if the RPM is not lower than the first reference value, the disc is identified as a DVD(+) type.

The method of identifying a type of disc further includes the operations of measuring the reflectivity of the disc, and identifying a second disc type between a one-time recordable type and a re-recordable type by comparing the reflectivity of the disc with a second reference value.

In the identification operation of the second disc type, if the reflectivity is higher than the second reference value, the disc is identified as a one-time recordable type and if the reflectivity is not higher than the second reference value, the disc is identified as a re-recordable type.

In one implementation, the detection of the RPM is performed after converting a motor control mode rotating the disc into a CLV (Constant Linear Velocity) servo mode based on a wobble signal.

According to another aspect of the present invention, an apparatus identifying a type of a disc includes a motor rotating the disc and a system controller identifying a type of the disc by comparing an RPM of the disc detected using a frequency signal generated at the motor with a first reference value.

The system controller identifies the disc as a DVD(−) type if the RPM is lower than the first reference value and as a DVD(+) type if the RPM is not lower than the first reference value.

The apparatus identifying a type of a disc may further include a pickup emitting light to the disc and receiving the light reflected by the disc, wherein the system controller determines whether the disc is a one-time recordable type or a re-recordable type based on the reflectivity measured on the basis of an amount of light received via the pickup.

The system controller determines that the disc is a one-time recordable type if the reflectivity is higher than a second reference value and that the disc is a re-recordable type if the reflectivity is not higher than the second reference value.

Additional aspects and/or advantages of the invention will be set forth in part in the description which follows and, in part, will be obvious from the description, or may be learned by practice of the invention.

BRIEF DESCRIPTION OF THE DRAWINGS

The above and/or other aspects and advantages of the present invention will become more apparent by describing embodiments thereof with reference to the attached drawings in which.

DETAILED DESCRIPTION OF THE INVENTION

Figure 1:
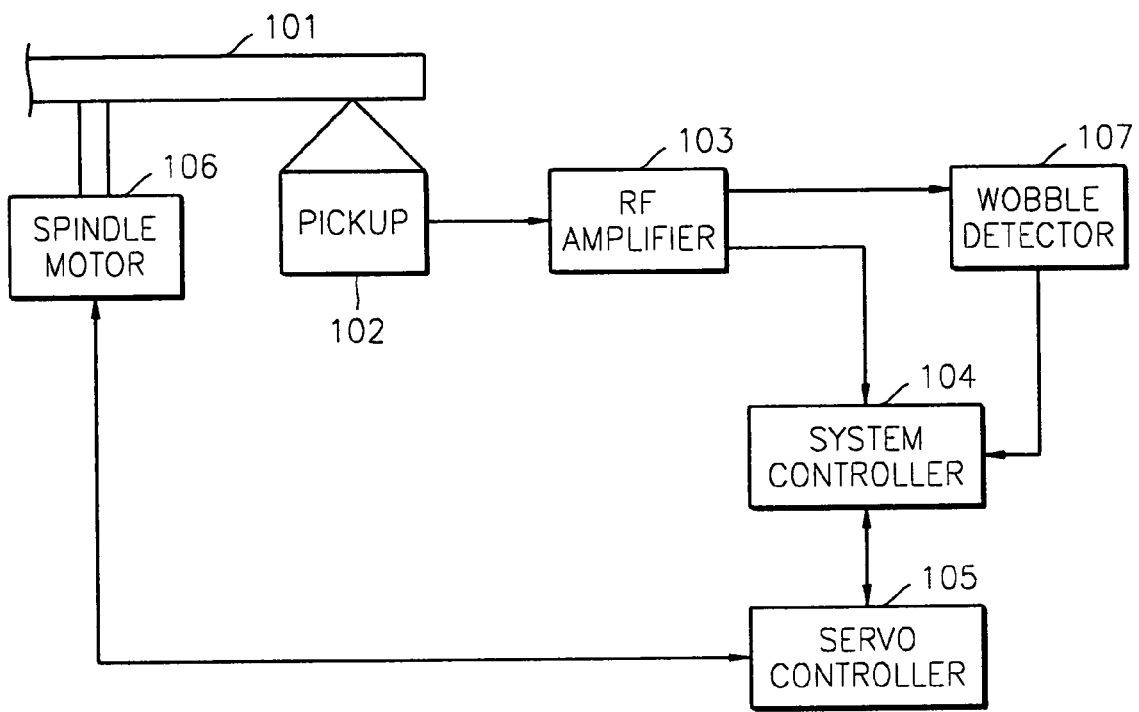
FIG. 1 is a block diagram of a disc drive including an apparatus identifying a type of a disc according to the present invention.

Embodiments of the present invention will now be described in detail with reference to the attached drawings, wherein like reference numerals refer to the like elements throughout.

FIG. 1 is a block diagram of a disc drive including an apparatus identifying a type of a disc according to the present invention. Referring to FIG. 1, a disc 101 can be loaded into the disc drive with the apparatus that includes a pickup 102, an RF (radio frequency) amplifier 103, a system controller 104, a servo controller 105, a spindle motor 106, and a wobble detector 107.

The disc 101 is a recordable disc, such as a DVD-R disc or a DVD+R disc, i.e., a one-time recordable disc, and a DVD-RW disc or a DVD+RW disc, i.e., a re-recordable disc on which data can be recorded several times.

Like a conventional pickup included in a conventional disc drive, the pickup 102 includes an objective lens (not shown), an actuator (not shown) driving the objective lens, a laser diode (not shown), and an optical detector (not shown). When the disc 101 is inserted into the disc drive, the pickup 102 is controlled by the servo controller 105 to emit light produced by the laser diode (not shown) to the disc 101 while moving the objective lens up and down. Further, the pickup 102 detects an amount of light reflected by the disc 101 and converged via the objective lens using the optical detector. Light detected using the optical detector is then provided to the RF amplifier 103.

The RF amplifier 103 converts light detected via the optical detector into an electrical signal provided to the system controller 104. Further, the RF amplifier 103 provides the wobble detector 107 with push-pull signals obtained from the RF signals transmitted by the pickup 102. The push-pull signals can be detected by a well-known method.

The system controller 104 detects disc reflectivity based on the amount of reflected light provided from the RF amplifier 103. The method of detecting the reflectivity based on the amount of reflected light is well known. The system controller 104 compares the detected reflectivity with a predetermined reference value. The reference value is determined to be able to distinguish between DVD-R/+R discs and DVD-RW/+RW discs. For example, the reference value can be determined to satisfy the reflectivity conditions. As such, if the reflectivity is between 45% and 80%, the disc 101 is identified as a DVD-R or DVD+R type, and if the reflectivity is between 18% and 30%, the disc 101 is identified as a DVD-RW or DVD+RW type.

Accordingly, if the detected reflectivity is higher than the reference value, the system controller 104 determines that the disc 101 is a one-time recordable type DVD, i.e., a DVD-R or DVD+R type disc. However, if the detected reflectivity is not higher than the reference value, the disc 101 is identified as a re-recordable type DVD, i.e., a DVD-RW or DVD+RW disc.

After the control mode of the spindle motor 106 is changed to a CLV (Constant Linear Velocity) servo mode based on wobble signals, the system controller 105 detects an RPM of the disc based on a FG (Frequency Generation) signal provided from the servo controller 105. Then, the system controller 104 compares the detected RPM with a reference value.

Figure 2A:
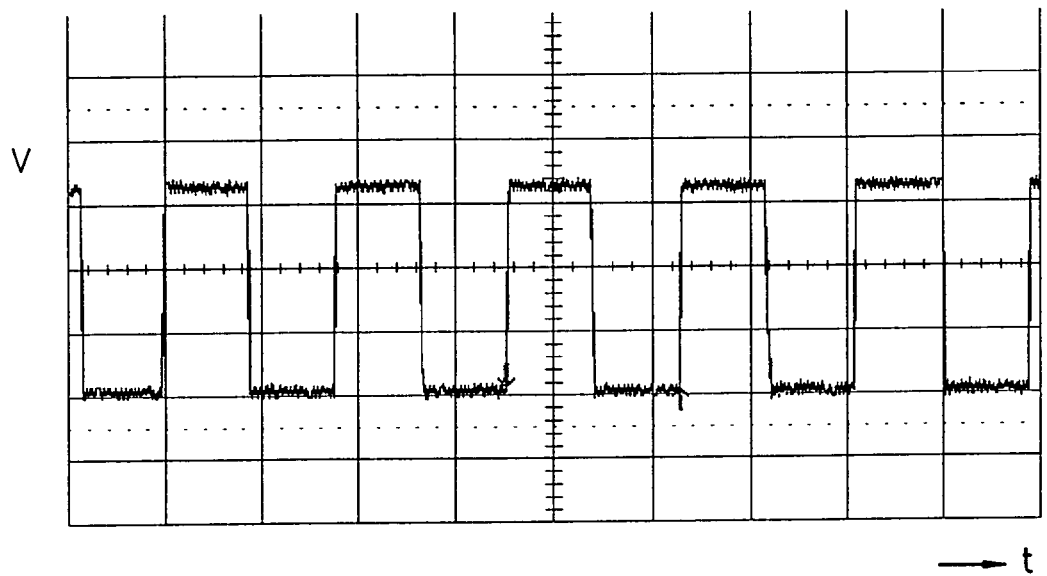
FIG. 2A shows waveforms of wobble signals detected from a DVD−R disc and FIG. 2B shows waveforms of wobble signals detected from a DVD−RW disc.
Figure 2B:
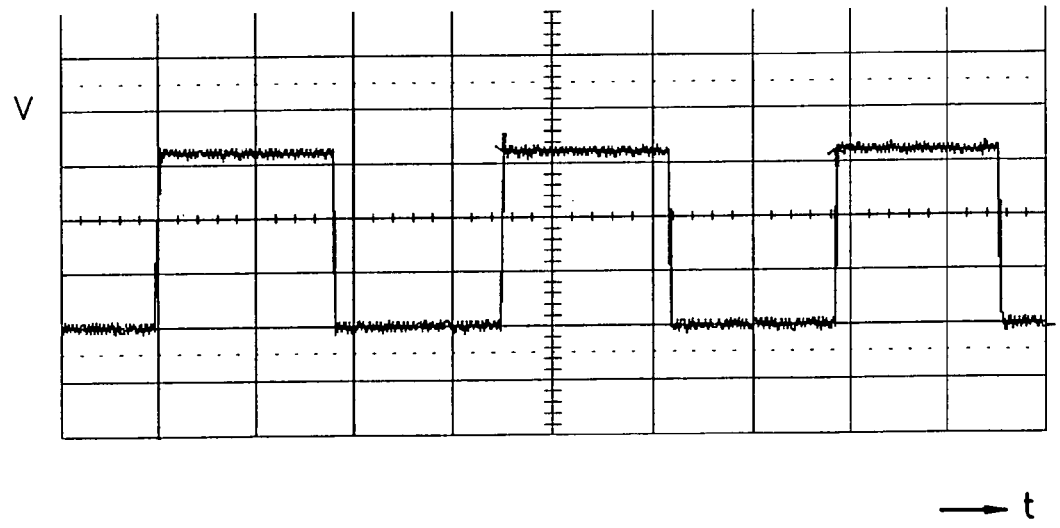
Figure 3A:
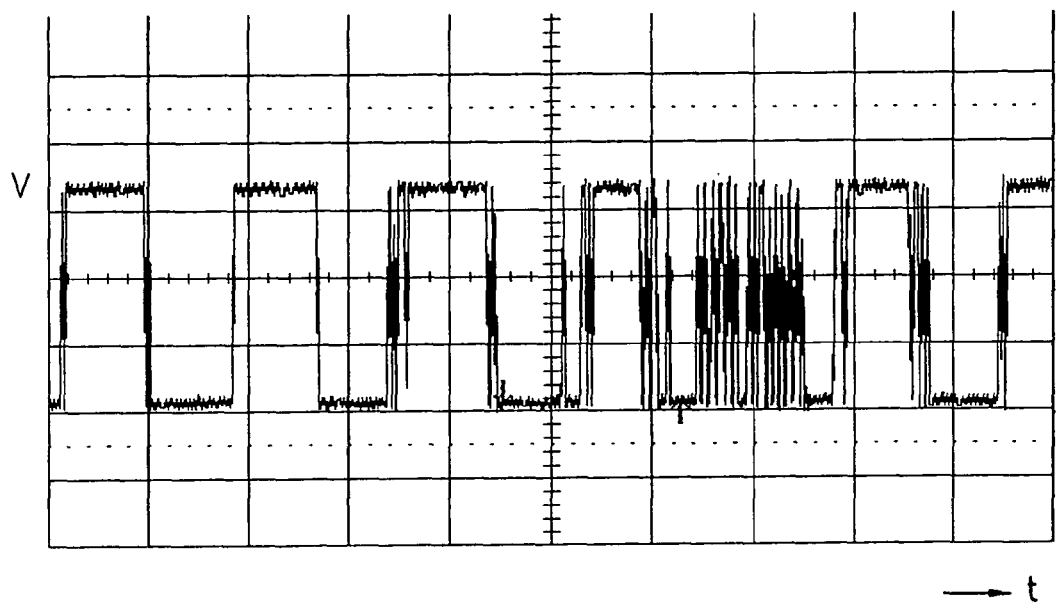
FIG. 3A shows waveforms of wobble signals detected from a DVD+R disc and FIG. 3B shows waveforms of wobble signals detected from a DVD+RW disc.
Figure 3B:
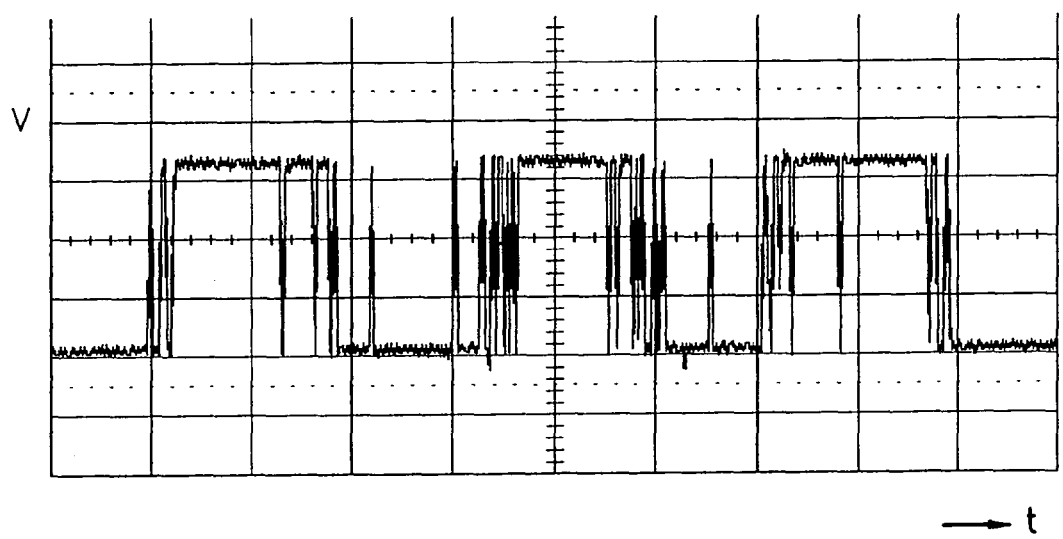

The reference value is determined to be able to distinguish between a DVD(-) type and a DVD(+) type of disc format. Therefore, the reference value can be a value slightly higher than the RPM, e.g., 2600 rpm, detected in a stabilized wobble CLV 1X mode. When the spindle motor 106 is controlled in the CLV servo mode based on the wobble signals, if the disc 101 is a DVD(-) type, the wobble signals are normally detected as shown in FIGS. 2A and 2B and, therefore, the detected RPM cannot exceed the RPM that can be detected in the wobble CLV 1X mode. However, if the disc 101 is a DVD(+) type, the wobble signals are abnormally detected as shown in FIGS. 3A and 3B and, therefore, the detected RPM can exceed the RPM that can be detected in the wobble CLV 1X mode due to overrun of the spindle motor 106. In the case of the DVD(+) type disc, the abnormal wobble signals are caused because wobble is formed on the disc in a phase modulation method.

Accordingly, if the detected RPM is lower than the reference value, the system controller 104 determines that the disc 101 is a DVD(-) type and if the detected RPM is not lower than the reference value, the disc 101 is identified as a DVD(+) type. If the disc 101 is determined to be a DVD(-) type, the system controller 104 sets the control mode of the spindle motor 106 to a stable wobble CLV servo mode. However, if the disc 101 is identified as a DVD(+) type, the system controller 104 returns the control mode of the spindle motor 106 to the control mode using the FG signals before reaching the maximum RPM of the disc drive in order to protect performance of the spindle motor 106. The control mode may return at the time when the detected RPM is 4000 to 5000 rpm.

The wobble detector 107 filters the push-pull signals from the RF signals output from the RF amplifier 103 using a bandpass filtering coefficient at a frequency of 145 KHz and detects wobble signals via a PLL circuit (not shown). If the disc 101 is a DVD(-) type, as the constant wobble envelope signals are periodically produced as described above with reference to the system controller 104, the PLL circuit functions in a wobble lock state and, accordingly, the wobble signals are normally detected as shown in FIGS. 2A and 2B. FIG. 2A shows waveforms of wobble signals detected from a DVD-R disc and FIG. 2B shows waveforms of wobble signals detected from a DVD-RW disc.

However, if the disc 101 is a DVD(+) type, as the wobble signals are not periodically produced as described above with reference to the system controller 104, the PLL circuit does not function in the wobble lock state. Accordingly, the wobble signals detected by the wobble detector 107 are abnormal as shown in FIGS. 3A and 3B. FIG. 3A shows waveforms of wobble signals detected from a DVD+R disc and FIG. 3B shows waveforms of wobble signals detected from a DVD+RW disc.

The servo controller 105 drives the actuator and thus moves the objective lens included in the pickup 102 up and down to detect the disc reflectivity. Further, the servo controller 105 rotates the spindle motor 106 under the control of the system controller 104. That is, under the control of the system controller 104, the servo controller 105 rotates the spindle motor 106 based on the FG signals generated from the spindle motor 106 or the wobble signals. Further, in order for the system controller 104 to detect the RPM, the servo controller 105 provides the system controller 104 with the FG signals generated from the spindle motor 106. The spindle motor 106 rotates the disc 101.

Figure 4:
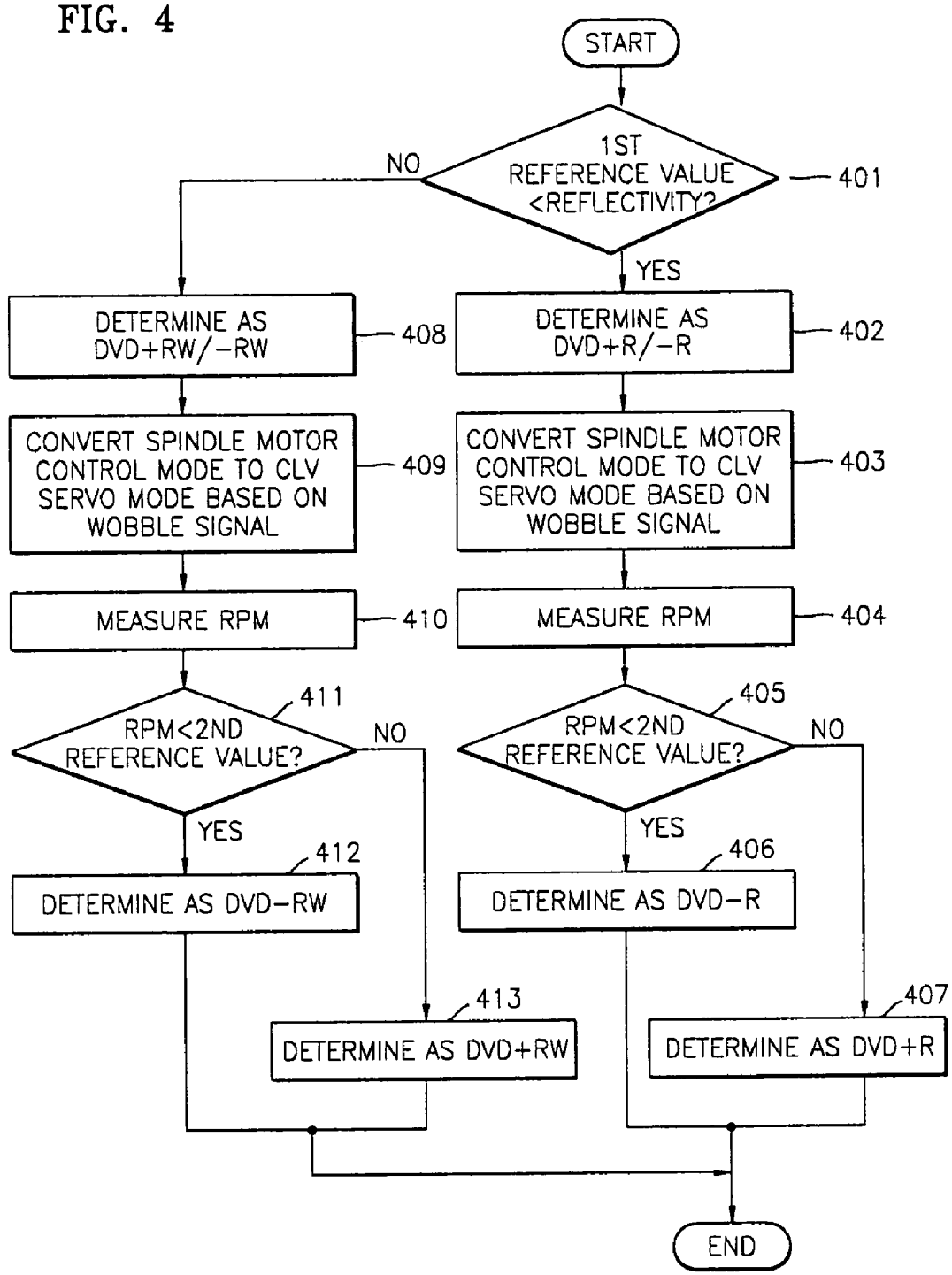
FIG. 4 is a flowchart of a method of identifying a type of a disc according to the present invention.

FIG. 4 is a flowchart of a method of identifying a type of a disc according to the present invention.

In OPERATION 401, the system controller 104 compares the disc reflectivity detected via the pickup 102 with a first reference value. The first reference value is the same as the reference value described above with reference to the system controller 104. If the detected reflectivity is higher than the first reference value, the system controller 104 determines in OPERATION 402 that the disc 101 is a DVD–R or DVD+R type.

In OPERATION 403, the system controller 104 converts the control mode of the spindle motor 106 to the CLV servo mode based on the wobble signals. Accordingly, the system controller 104 outputs a control signal to control the speed of the spindle motor 106 using the wobble signals detected via the wobble detector 107.

While the spindle motor 106 is operating in the CLV servo mode based on the wobble signals, the system controller 104 detects an RPM in OPERATION 404 using the FG signals generated from the spindle motor 106.

In OPERATION 405, the system controller 104 compares the detected RPM with a second reference value. The second reference value is the same as the reference value described above with reference to the system controller 104. If the RPM detected in OPERATION 405 is lower than the second reference value, the system controller 104 determines in OPERATION 406 that the disc 101 is a DVD–R type and ends the disc type identification process. Thereafter, the system controller 104 can operate the spindle motor 106 in a stable wobble CLV servo mode.

However, if the RPM is not lower than the second reference value, the system controller 104 determines in OPERATION 407 that the disc 101 is a DVD+R type and ends the disc type identification process. Thereafter, the system controller 104 returns to the control mode based on the FG signals in order not to damage the spindle motor 106.

If the disc reflectivity detected in OPERATION 401 is not higher than the first reference value, the system controller 104 determines in OPERATION 408 that the disc 101 is a DVD–RW or DVD+RW disc.

Thereafter, in OPERATION 409, the system controller 104 converts the control mode of the spindle motor 106 to the CLV servo mode based on the wobble signals. Then, the system controller 104 outputs a control signal to control the speed of the spindle motor 106 using the wobble signals detected via the wobble detector 107.

In OPERATION 410, the system controller 104 detects an RPM using the FG signals generated from the spindle motor 106. In OPERATION 411, the system controller 104 compares the detected RPM with the second reference value. If the RPM is lower than the second reference value, the system controller 104 determines in OPERATION 412 that the disc 101 is a DVD–RW type and ends the disc type identification process. Thereafter, the system controller 104 controls the spindle motor 106 in a stable wobble CLV servo mode.

However, if the RPM is not lower than the second reference value, the system controller 104 determines in OPERATION 413 that the disc 101 is a DVD+RW type and ends the disc type identification process. Thereafter, the system controller 104 can return to the control mode based on the FG signals in order not to damage the spindle motor 106.

As described above, according to the present invention, it is possible to distinguish between a DVD–R/+R type disc and a DVD–RW/+RW disc using reflectivity and to distinguish between a DVD(–) type disc and a DVD(+) type disc using an RPM during an initial disc driving period. Further, it is possible to set operational conditions adequate to the disc type within a reduced lead-in time.

While the present invention has been particularly shown and described with reference to embodiments thereof, it will be understood by those of ordinary skill in the art that various changes in form and details may be made therein without departing from the spirit and scope of the present invention as defined by the appended claims.

What is claimed is:

1. A method of identifying a type of a disc, comprising:
   detecting an RPM (Rotation Per Minute) of the disc; and
   identifying a first disc type of comparing the RPM with a first reference value,
   wherein the first reference value is in a form of RPM,
   wherein the identifying of the first disc type includes determining that the disc is a DVD(–) type if the RPM is lower than the first reference value and that the disc is a DVD(+) type if the RPM is not lower than the first reference value.

2. The method of claim 1, further comprising:
   measuring reflectivity of the disc; and
   identifying a second disc type either as a one-time recordable disc type or as a re-recordable disc type by comparing the reflectivity of the disc with a second reference value.

3. An apparatus identifying a type of disc, comprising:
   a motor rotating the disc; and
   a system controller identifying the type of the disc by comparing an RPM of the disc detected using a frequency signal generated at the motor with a first reference value,
   wherein the first reference value is in a form of RPM,
   wherein the system controller determines that the disc is a DVD(–) type if the RPM is lower than the first reference value and that the is disc is a DVD(+) type if the RPM is not lower than the first reference value.

4. The apparatus of claim 3, further comprising a pickup which emits light on the disc and receives light reflected by the disc, wherein the system controller determines whether the disc is a one-time recordable disc type or a re-recordable disc type according to the reflectivity measured on the basis of light received via the pickup.

5. A method of identifying a disc type, comprising:
   comparing a reflectivity of light from a disc to a reflective reference value;
   identifying the disc type as a one-time re-recordable type if the reflectivity is higher than the reflectivity reference value and as a re-recordable type if the reflectivity is less than the reflectivity reference value;
   comparing an RPM of the disc to a speed reference value;
   identifying the disc format as a DVD(–) type disc if the RPM is lower than the speed reference value or as a DVD(+) type if the RPM is higher than the speed reference value; and
   setting the speed reference value to identify the disc as a DVD(–) type if the disc rotates at 2600 RPM in a stabilized wobble CLV 1X mode and as a DVD(–) type if the disc rotates at a velocity exceeding 2600 RPM.

6. A method of identifying a disc type, comprising:
   comparing a reflectivity of light from a disc to a reflectivity reference value;
   identifying the disc type as a one-time re-recordable type if the reflectivity is higher than the reflectivity reference value and as a re-recordable type if the reflectivity is less than the reflectivity reference value;
   comparing an RPM of the disc to a speed reference value;
   identifying the disc format as a DVD(–) type disc if the RPM is lower than the speed reference value or as a DVD(+) type if the RPM is higher than the speed reference value;

setting a control mode of a spindle motor to a stable wobble CLV servo mode if the disc is identified as a DVD(−) type to control the RPM of the disc; and returning a spindle motor to a control mode using FG signals before reaching a maximum RPM of the disc drive in order to protect performance of the spindle motor if the disc is identified as a DVD(+) type.

7. The method of claim 6, wherein the returning comprises returning to the control mode when the detected RPM is 4000 to 5000 rpm.

8. A method of identifying a type of a disc, comprising:

comparing a disc reflectivity with a first reference value;

identifying the disc as a DVD(R) type if the reflectivity is higher than the first reference value and as a DVD(RW) if the reflectivity is lower than the first reference value:

generating FG signals from a spindle motor; and measuring an RPM of the disc using the FG(Frequency Generation) signals;

comparing a measured RPM with a second reference value; and identifying the disc as a DVD(−) type if the RPM is lower than the second reference value and as a DVD(+) type if the RPM is higher than the second reference value.

\* \* \* \* \*

UNITED STATES PATENT AND TRADEMARK OFFICE
CERTIFICATE OF CORRECTION

PATENT NO.         : 7,397,745 B2                                          Page 1 of 1
APPLICATION NO.    : 10/615984
DATED              : July 8, 2008
INVENTOR(S)        : Sang-Whook Kim et al.

It is certified that error appears in the above-identified patent and that said Letters Patent is hereby corrected as shown below:

Column 6, Line 31, change "the is disc" to --the disc--.

Column 6, Line 53, change "DVD(-)" to --DVD(+)--.

Column 8, Line 3, change "value:" to --value;--.

Signed and Sealed this

Twenty-eighth Day of October, 2008

JON W. DUDAS
*Director of the United States Patent and Trademark Office*